(12) United States Patent
Weichselbaum et al.

(10) Patent No.: US 12,534,205 B2
(45) Date of Patent: Jan. 27, 2026

(54) REAL-TIME CONTROL FOR PASSENGER COMFORT AND SLEEP QUALITY FOR AIRCRAFT SEATING

(71) Applicant: B/E Aerospace, Inc., Winston-Salem, NC (US)

(72) Inventors: Noah Avram Meltz Weichselbaum, Prairie Village, KS (US); Andrew Radlbeck, South Glastonbury, CT (US); Haytham Hakla, Montreal (CA); Fangzhong Guo, Shoreline, WA (US); Brian E. St. Rock, Andover, CT (US); Pankaj Kalore, Lincolnshire, IL (US); Hemanth Raghav Gajendra, Bangalore (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 19/182,159

(22) Filed: Apr. 17, 2025

(65) Prior Publication Data
US 2025/0353596 A1 Nov. 20, 2025

(30) Foreign Application Priority Data
May 20, 2024 (IN) .............................. 202411039336

(51) Int. Cl.
B64D 11/06 (2006.01)

(52) U.S. Cl.
CPC ...... *B64D 11/0604* (2014.12); *B64D 11/0626* (2014.12)

(58) Field of Classification Search
CPC ................... B64D 11/0604; B64D 11/0626
See application file for complete search history.

(56) References Cited

U.S. PATENT DOCUMENTS 10,176,694 B2 * 1/2019 Sharma .............. B64D 11/0646
11,203,433 B2 12/2021 Dowty et al.
(Continued)

FOREIGN PATENT DOCUMENTS

GB        2563566 A    12/2018
WO   2012156654 A1   11/2012

OTHER PUBLICATIONS

Okamoto-Mizuno et al., "Effects of thermal environment on sleep and circadian rhythm" Journal of Physiological Anthropology, May 31, 2012, 9 pages.

*Primary Examiner* — Tye William Abell
(74) *Attorney, Agent, or Firm* — Suiter Swantz IP

(57) ABSTRACT

A system may include one or more optical sensors configured to capture one of an image feed or a video feed of a passenger and a controller communicatively coupled to the plurality of sensors. The controller may be configured to: receive a set of sensor data from the plurality of sensors; determine a first sleep state of the passenger; determine a first set of controls associated with the first sleep state; provide the first set of controls associated with the first sleep state to the at least one aircraft environment sub-system automatically, in near real-time; determine a second sleep state of the passenger; determine a second set of controls associated with the second sleep state; and provide the second set of controls associated with the second sleep state to the at least one aircraft environment sub-system automatically, in near real-time.

20 Claims, 10 Drawing Sheets

(56) References Cited

U.S. PATENT DOCUMENTS

2017/0066534 A1    3/2017  Sharma
2022/0409112 A1*  12/2022  Borraz .................. G16H 20/70
2023/0024865 A1*  1/2023  Guy ..................... A61B 5/6887
2024/0262503 A1*  8/2024  Kalore ............... B64D 11/0015

* cited by examiner

REAL-TIME CONTROL FOR PASSENGER COMFORT AND SLEEP QUALITY FOR AIRCRAFT SEATING

CROSS-REFERENCE TO RELATED APPLICATIONS

The present application claims the benefit of India Provisional Application No. 202411039336, filed May 20, 2024, which is herein incorporated by reference in the entirety.

TECHNICAL FIELD

The present disclosure is directed towards an aircraft seat, and more particularly, to a real-time control system for passenger comfort and sleep quality for an aircraft seat.

BACKGROUND

Aircraft sleeping environments are often markedly different from a typical residential sleeping environment. The ability to optimize sleep quality is much more challenging due to the unpredictable environment of the aircraft, e.g., due to larger temperature fluctuations, disturbances from passengers/crew members, aircraft turbulence, and the like. As such, there is a need for a system and method for real-time control of passenger comfort and sleep quality.

SUMMARY

A system is disclosed, in accordance with one or more embodiments of the present disclosure. In embodiments, the system includes: a plurality of sensors, where the plurality of sensors include: one or more optical sensors configured to capture one of an image feed or a video feed of a passenger; one or more thermal sensors configured to measure a body temperature of the passenger; and one or more pressure sensors; and a controller communicatively coupled to the plurality of sensors, the controller including one or more processors configured to execute program instructions configured to cause the one or more processors to: receive a set of sensor data from the plurality of sensors, where the set of sensor data includes at least one of the captured image feed, the captured video feed, the measured body temperature of the passenger, a respiratory rate of the passenger, or a heart rate of the passenger; determine a first sleep state of the passenger based on received set of sensor data from the plurality of sensors and one or more predetermined factors, where the first sleep state of the passenger includes attempting to fall asleep; determine a first set of controls associated with the first sleep state for at least one aircraft environment sub-system; provide the first set of controls associated with the first sleep state to the at least one aircraft environment sub-system automatically, in near real-time; determine a second sleep state of the passenger based on the received set of sensor data from the plurality of sensors and one or more additional predetermined factors, where the second sleep state includes sleeping; determine a second set of controls associated with the second sleep state for the at least one aircraft environment sub-system; and provide the second set of controls associated with the second sleep state to the at least one aircraft environment sub-system automatically, in near real-time.

In some embodiments, the determine a first set of controls associated with the first sleep state for at least one aircraft environment sub-system may include adjusting an ambient light of the at least one aircraft environment sub-system to promote falling asleep.

In some embodiments, the adjusting an ambient light to promote falling asleep may include at least one of adjusting a brightness level of the ambient light or adjusting a wavelength of the ambient light.

In some embodiments, the determine a first set of controls associated with the first sleep state for at least one aircraft environment sub-system may include adjusting a noise cancellation device to promote falling asleep.

In some embodiments, the determine a second set of controls associated with the second sleep state for the at least one aircraft environment sub-system may include adjusting a core body temperature of the passenger.

In some embodiments, the adjusting a core body temperature of the passenger may include adjusting a cushion temperature of an aircraft seat.

In some embodiments, the adjusting a core body temperature of the passenger may include adjusting a heating and cooling system of an aircraft passenger suite.

In some embodiments, the determine a second set of controls associated with the second sleep state for at least one aircraft environment sub-system may include adjusting a pressure distribution of one or more air bladders within a seat cushion of an aircraft seat.

In some embodiments, the one or more optical sensors may include one or more optical cameras, where the one or more optical cameras are passenger-facing to one of continuously or periodically capture one of the image feed or the video feed of the passenger.

In some embodiments, the one or more thermal sensors may include one or more thermal cameras, where the one or more thermal cameras are passenger-facing to one of continuously or periodically capture one of the image feed or the video feed of the passenger, where the one or more thermal cameras are configured to measure a surface facing temperature of the passenger.

In some embodiments, the one or more thermal sensors may include one or more temperature sensors integrated within a seat cushion of an aircraft seat, where the one or more temperature sensors are configured to measure a temperature between an interface of the passenger and the seat cushion of the aircraft seat.

In some embodiments, the controller may be further configured to identify an article on the passenger based on the thermal image feed or the thermal video feed based on a one-dimensional thermal model.

In some embodiments, the one or more temperature sensors may include one or more thermocouples.

In some embodiments, the one or more pressure sensors may be integrated within a seat cushion of an aircraft seat.

In some embodiments, the controller may be further configured to receive a passenger wake up time.

In some embodiments, the controller may be further configured to determine a third set of controls associated with the passenger wake up time for the at least one aircraft environment sub-system.

In some embodiments, the determine a third set of controls associated with the passenger wake up time for the at least one aircraft environment sub-system may include adjusting an ambient light to promote falling asleep, where the adjusting an ambient light to promote falling asleep includes at least one of adjusting a brightness level of the ambient light or adjusting a wavelength of the ambient light.

In some embodiments, the determine a third set of controls associated with the passenger wake up time for the at least one aircraft environment sub-system may include adjusting a core body temperature of the passenger, where the adjusting a core body temperature of the passenger includes at least one of adjusting a cushion temperature of an aircraft seat or adjusting a heating and cooling system of an aircraft passenger suite.

A method is disclosed, in accordance with one or more embodiments of the present disclosure. In embodiments, the method includes: receiving a set of sensor data from a plurality of sensors, where the set of sensor data includes at least one of an image feed, a video feed, a measured body temperature of a passenger, a respiratory rate of the passenger, or a heart rate of the passenger; determining a first sleep state of the passenger based on the received set of sensor data from the plurality of sensors and one or more predetermined factors, where the first sleep state of the passenger includes attempting to fall asleep; determining a first set of controls associated with the first sleep state for at least one aircraft environment sub-system; providing the first set of controls associated with the first sleep state to the at least one aircraft environment sub-system automatically, in near real-time; determining a second sleep state of the passenger based on the received set of sensor data from the plurality of sensors and one or more additional predetermined factors, where the second sleep state includes sleeping; determining a second set of controls associated with the second sleep state for the at least one aircraft environment sub-system; and providing the second set of controls associated with the second sleep state to the at least one aircraft environment sub-system automatically, in near real-time.

A passenger aircraft seat is disclosed, in accordance with one or more embodiments of the present disclosure. In embodiments, the passenger aircraft seat includes an aircraft seat, one or more aircraft environment sub-systems, and a plurality of sensors. In embodiments, the plurality of sensors include one or more optical sensors configured to capture one of an image feed or a video feed of a passenger, one or more thermal sensors configured to measure a body temperature of the passenger, and one or more pressure sensors integrated within the aircraft seat. In embodiments, the passenger aircraft seat further includes a controller communicatively coupled to the plurality of sensors, the controller including one or more processors configured to execute program instructions configured to cause the one or more processors to: receive a set of sensor data from the plurality of sensors, where the set of sensor data includes at least one of the captured image feed, the captured video feed, the measured body temperature of the passenger, a respiratory rate of the passenger, or a heart rate of the passenger; determine a first sleep state of the passenger based on the received set of sensor data from the plurality of sensors and one or more predetermined factors, where the first sleep state of the passenger includes attempting to fall asleep; determine a first set of controls associated with the first sleep state for at least one aircraft environment sub-system of the one or more aircraft environment sub-systems; provide the first set of controls associated with the first sleep state to the at least one aircraft environment sub-system of the one or more aircraft environment sub-systems automatically, in near real-time; determine a second sleep state of a passenger based on the received set of sensor data from the plurality of sensors and one or more additional predetermined factors, where the second sleep state includes sleeping; determine a second set of controls associated with the second sleep state for the at least one aircraft environment sub-system of the one or more aircraft environment sub-systems; and provide the second set of controls associated with the second sleep state to the at least one aircraft environment sub-system of the one or more aircraft environment sub-systems automatically, in near real-time.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
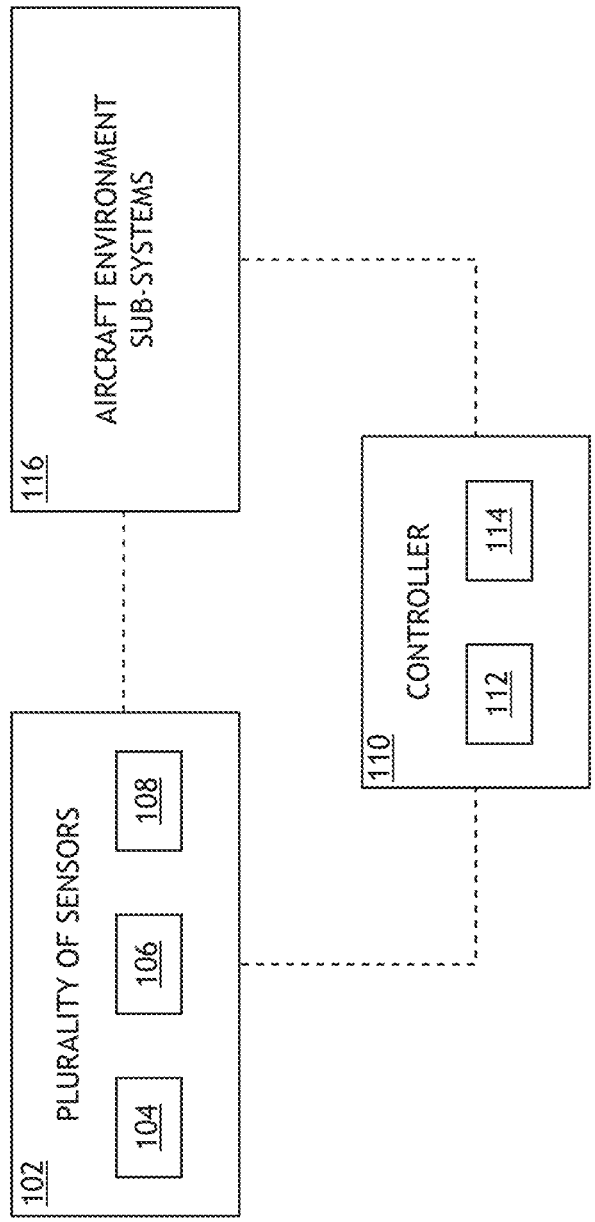
FIG. 1 is a simplified block diagram of a system, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-8 in general illustrate a system and method for real-time passenger monitoring and comfort control, in accordance with one or more embodiments of the disclosure.

Aircraft sleeping environments are often markedly different from a typical residential sleeping environment. The ability to optimize sleep quality is much more challenging due to the unpredictable environment of the aircraft, e.g., due to larger temperature fluctuations, disturbances from passengers/crew members, aircraft turbulence, and the like. As such, there is a need for a system and method for real-time control of passenger comfort and sleep quality.

Conventional passenger comfort systems are controlled manually, typically through a mechanical switch or a sliding scale on an in-flight entertainment (IFE). Manual controls for such comfort systems become a problem for passenger comfort during the stage of the flight where attempting to fall asleep or actively sleeping. For example, for adjustment of heating and cooling, a passenger may select a higher temperature setpoint prior to falling asleep in an attempt to get comfortable. However, falling asleep in this state can lead to a condition where a passenger is awoken from either being too hot or cold. By way of another example, for pressure control adjustment, a setting may be selected that is optimum for one sleeping position, but with movement while asleep (e.g., like a shift from one's back to side) can result in high peak pressure points. Both of these artifacts from manual comfort settings negatively impact a passenger during the sleep state and adversely impact comfort sleep quality.

Additionally, conventional temperature measurement sensors use invasive techniques to measure the temperature of a user. This invasive sensors are uncomfortable for the user. Further, some temperature measurement techniques have integration issues. For example, multiple heat flux sensors may be placed on a top surface of a cushion and used to measure a temperature thereof. Such techniques create comfort issues and create electro-static device (ESD) problems caused by the frictional effects between passenger clothing and the seat dress cover that can be transmitted via wired contact to sensitive control electrodes.

As such, it would be desirable to provide a system and method for real-time passenger monitoring and comfort control. The system should provide a non-invasive method of detecting a passenger's state (e.g., awake, attempting to sleep, sleeping, or the like) and associated physiological parameters important for sleep (e.g., respiratory rate, heart rate, body temperature, and the like). The system should provide real-time control of the aircraft environment to enhance sleep, e.g., improve sleep quality and duration. For example, the system may receive inputs from a fusion of thermal, optical, and/or pressure sensors (e.g., optical cameras, thermal cameras, thermocouples, pressure sensors, and like). Further, the system should provide control of at least one of temperature, humidity, cushion pressure, lighting, active noise cancellation, and the like to optimize the phases of the sleep cycle (e.g., wake/alert, light sleep (N1), deeper sleep (N2), deepest non-REM sleep (N3), and REM).

It is contemplated herein that jet-lag may be mitigated with circadian rhythm manipulation by automated control of the lighting and thermal regulation, as generally discussed in Effects of thermal environment of sleep and circadian rhythm, Journal of Physiological Anthropology, published by K. Mizuno on May 31, 2012, which is incorporated herein by reference in the entirety. As such, by controlling at least one of temperature and lighting within the aircraft environment, and in some instances, cushion firmness and noise cancellation, the system and method is able to improve the quality and duration of a passenger's sleep during long haul flights.

FIG. 1 illustrates a simplified block diagram of a system 100 for real-time passenger monitoring and comfort control, in accordance with one or more embodiments of the disclosure.

The system 100 includes a plurality of sensors 102. The plurality of sensors 102 may be configured for non-invasive detection of a passenger's state (e.g., awake, attempting to sleep, or sleeping) and physiological parameters related to sleep.

In embodiments, the plurality of sensors 102 may include one or more optical sensors 104. For example, the one or more optical sensors 104 may include one or more passenger-facing optical cameras 104 configured to continuously or periodically image a passenger (or an area surrounding a passenger). For instance, the one or more passenger-facing cameras 104 may include one or more optical cameras 104 configured to continuously or periodically monitor the passenger's state (e.g., awake, attempting to sleep, or sleeping), as will be discussed further herein.

Passenger-facing cameras/sensors are generally discussed in U.S. Patent Publication No. 20240262503, published Aug. 8, 2024, which is herein incorporated by reference in the entirety.

In embodiments, the plurality of sensors 102 may include one or more thermal sensors 106. For example, the one or more thermal sensors 106 may include one or more passenger-facing thermal cameras 106 configured to continuously or periodically monitor a passenger's front facing surface temperature, as will be discussed further herein. By way of another example, the one or more thermal sensors 106 may include one or more integrated seat thermal sensors 106 integrated within the seat cushion (e.g., thermocouples, or the like). For instance, the one or more integrated seat thermal sensors 106 may be configured to measure a temperature between the seat cushion and the skin of the passenger. In this regard, the one or more thermal sensors 106 integrated within the seat may measure the skin temperature of the passenger, which is not visible to the thermal camera, such that the system 100 is able to accurately measure a body temperature of the passenger.

In embodiments, the one or more integrated seat thermal sensors 106 may be the same temperature sensors embedded within the seat's heating and cooling module. For example, the integrated seat thermal sensors 106 may detect the interface temperature between the passenger and the cushion, as well as provide heating/cooling function for the seat cushion itself. Heating and cooling of cushions for aircraft seats is generally discussed in U.S. Publication No. 20250353599, published on Nov. 20, 2025, which is herein incorporated by reference in the entirety. It is further contemplated herein, the one or more thermocouples of the heating and cooling module may be outside of the seat 210. Therefore, the above description shall not be construed as limiting the scope of the present disclosure.

It is contemplated herein that the integrated seat thermal sensors 106 may be in addition to the seat's heading and cooling module, such that different thermal sensors are used to measure a passenger's temperature and provide heating/cooling function for the seat cushion. Therefore, the above description shall not be construed as limiting the scope of the present disclosure.

In embodiment, the plurality of sensors 102 may include one or more pressure sensors 108. For example, the one or more pressure sensors 108 may include one or more pressure sensors 108 within the seat cushion. For instance, the one or more pressure sensors 106 may be configured to collect pressure sensor data, as will be discussed further herein. For example, the pressure sensor data may include passenger movement data. By way of another example, the passenger sensor data may include passenger respiratory rate and/or heart rate. In this regard, the activity level of the passenger may be determined based on the pressure data in conjunction with the image/video feed from the optical camera 104 to determine other sleep critical states such as the act of a passenger going to sleep (or actively sleeping).

In embodiments, the one or more pressure sensors 108 may be further configured to control one or more air bladders in the aircraft seat. For example, as will be discussed further herein with respect to FIGS. 3A-3B, the seat cushion of the aircraft seat may include one or more air bladders 300. In this regard, in a non-limiting example, the one or more pressure sensors 108 may first detect a sleeping position of a passenger (e.g., sleeping on back, stomach, side, or the like) and adjust the air bladders of the seat cushion accordingly to avoid high peak pressure points.

It is contemplated herein that optical cameras and thermal cameras may be a single camera or separate cameras. Therefore, the above discussion should not be construed as limiting the scope of the present disclosure.

The plurality of sensors 102 may further include one or more seat position sensors. For example, the seat position sensors may determine a position of the aircraft seat (e.g., upright, reclined, lie-flat, or the like). In this regard, the seat position data may be used to determine a passenger's state.

The system 100 may further include one or more controllers 110. The one or more controllers 110 may include one or more processors 112 configured to execute one or more program instructions stored in a memory 114 (a memory medium 114). The one or more controllers 110 may include one or more state machines stored in memory 114.

In embodiments, the one or more controllers 110 may be configured to provide automatic, real-time control of one or more aircraft environment sub-systems 116. For example, the one or more processors 112 may associate at least one of a passenger state (e.g., awake, attempting to fall asleep, actively sleeping) or a physiological parameter (e.g., body temperature, respiratory rate, heart rate, or the like) with a manipulation to at least one aircraft environment sub-system 116 of the one or more aircraft environment sub-systems 116. For example, as will be discussed further herein, the one or more processors 112 may determine that the passenger is attempting to fall asleep based on inputs from the plurality of sensors 102 and automatically adjust a parameter of at least one aircraft environment sub-system 116 of the one or more aircraft environment sub-systems 116 in near real-time to aid the passenger in falling asleep. For instance, the automated controls may begin with the seats' ambient lighting and active noise cancellation. Continuing with the above example, as will be discussed further herein, the one or more processors 112 may then determine that the passenger has fallen asleep based on inputs from the plurality of sensors 102 and automatically adjust a parameter of at least one aircraft environment sub-system 116 of the one or more aircraft environment sub-systems 116 in near real-time to aid the passenger in staying asleep. For instance, once it is detected that a passenger is asleep, the automated controls may adjust cushion temperature to support deep sleep state based on a predetermined temperature profile along with active uniform pressure distribution by an array of individually controlled air bladders of the seat cushion. Continuing with the above example, as will be discussed further herein, the one or more processors 112 may automatically adjust a parameter of at least one aircraft environment sub-system 116 of the one or more aircraft environment sub-systems 116 in near real-time based on an inputted wake-up time (e.g., passenger inputted or system inputted). For instance, the automated controls may include increased intensity of light and emission of a specified spectrum of light, along with cushion heating/cooling to gently raise the passenger's core temperature to allow for a gradual wake up (rather than being jolted awake).

It is contemplated herein that the one or more aircraft environment sub-systems 116 may include, but are not limited to, one or more passenger suite lights, one or more noise cancellation devices, one or more heating/cooling devices (e.g., suite temperature devices, cushion temperature devices, or the like), one or more in-flight entertainment devices, one or more seat cushions, one or more seat actuators, or the like.

Figure 2A:
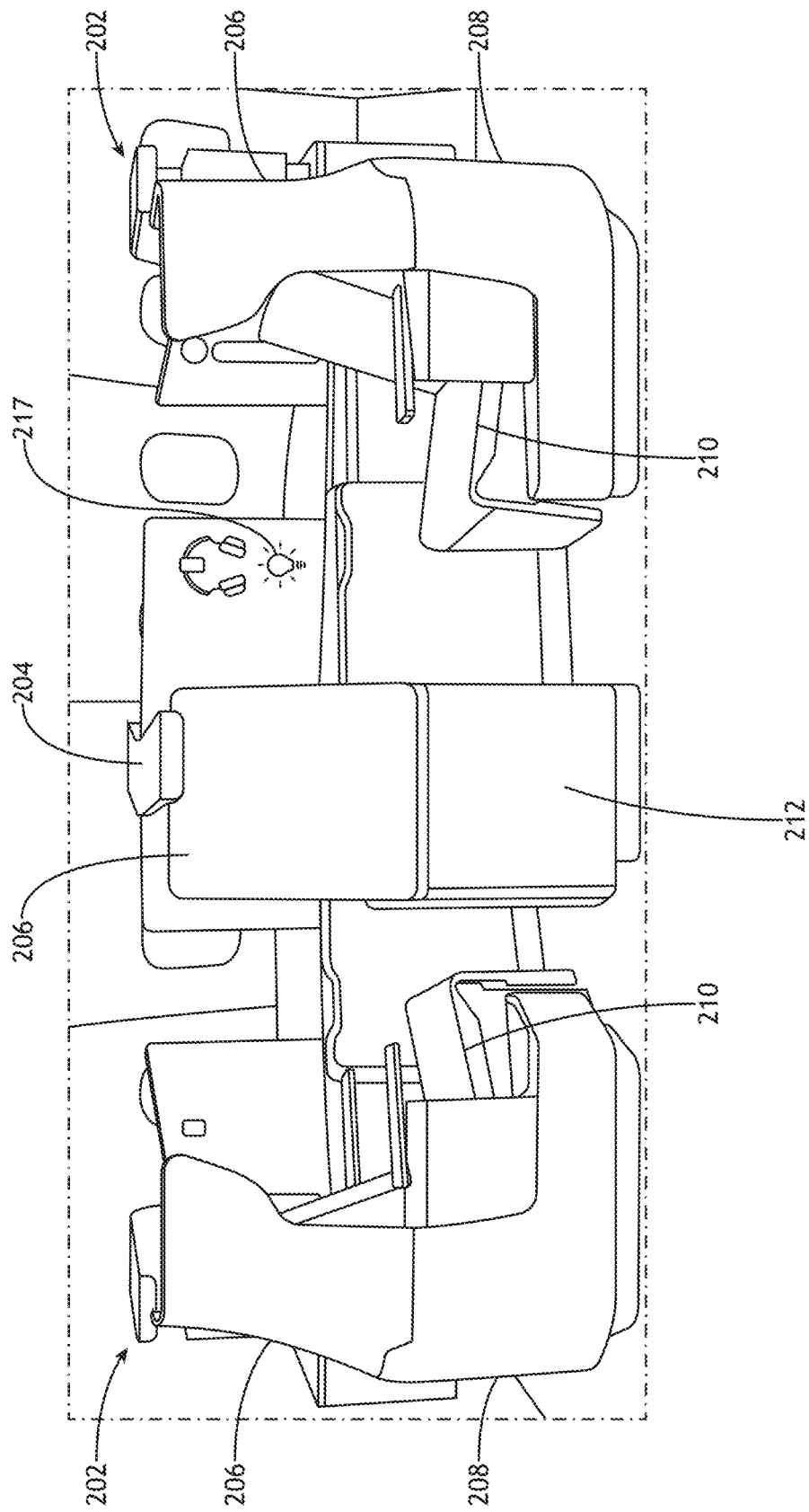
FIG. 2A is a simplified schematic of an aircraft passenger suite including the system, in accordance with one or more embodiments of the disclosure.
Figure 2B:
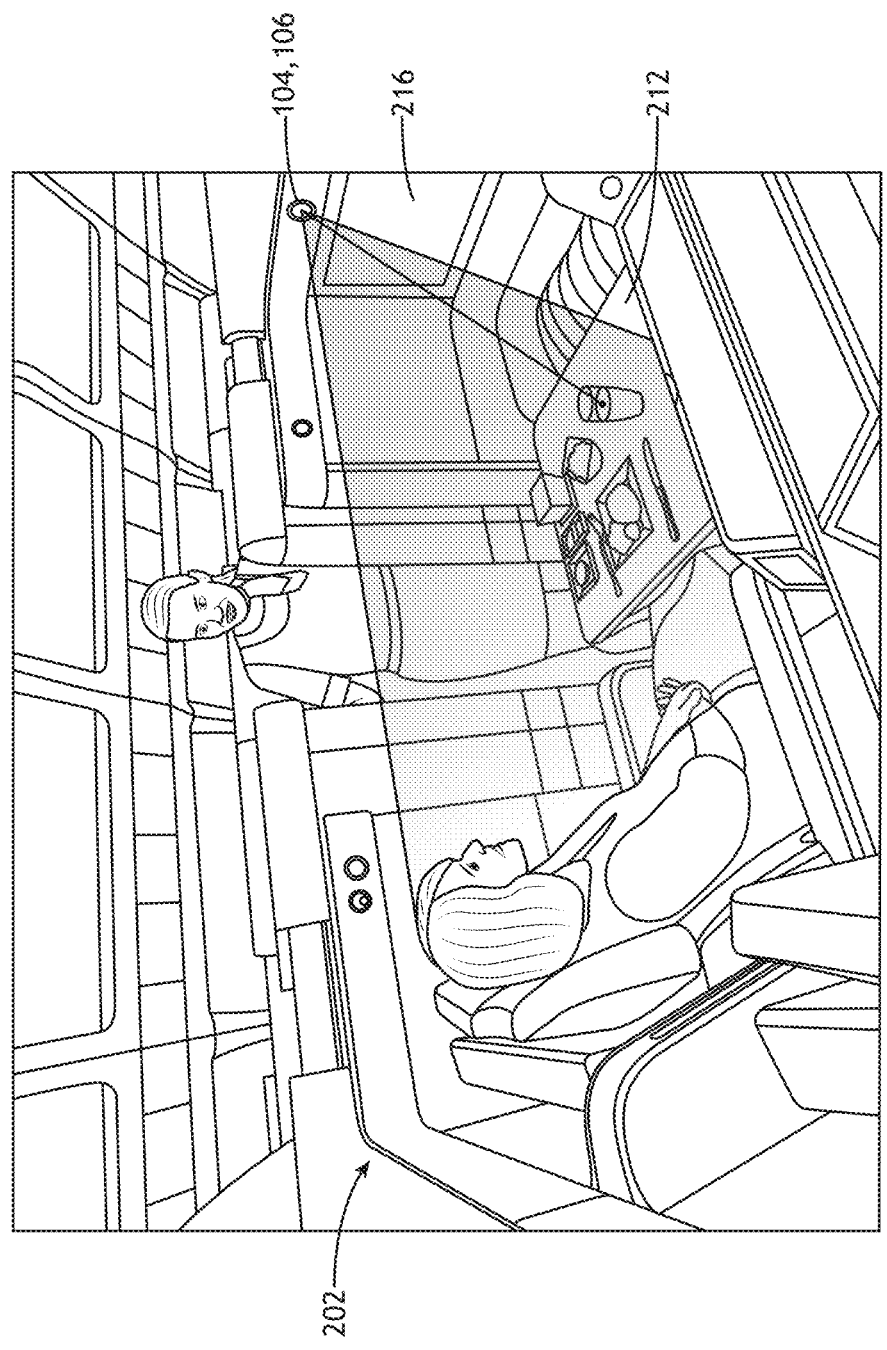
FIG. 2B is a simplified schematic of the aircraft passenger suite including the system, in accordance with one or more embodiments of the disclosure.

FIGS. 2A-2B illustrate an aircraft cabin 200 and one or more passenger suites 202, in accordance with one or more embodiments of the disclosure.

Where there are multiple passenger suites 202, the multiple passenger suites 202 may be separated by a bridge 204. The bridge 204 may define at least a portion of each of the multiple passenger suites 202. It is noted herein that adjacent passenger suites 202 may be considered as on particular sides of the bridge 204. Where there are multiple passenger suites 202, the multiple passenger suites 202 may be arranged in an inboard/outboard configuration and/or a forward/rearward configuration. It is noted, however, that the multiple passenger suites 202 may be arranged in any configuration within the aircraft cabin 200.

The passenger suite 202 may include a suite wall 206 with one or more suite wall elements 208. For example, at least some of the one or 11 more suite wall elements 208 may be a component of a particular suite wall 206 corresponding to a particular passenger suite 202. By way of another example, at least some of the one or more suite wall elements 208 (e.g., to the entirety of a suite wall 206 structure) may be shared between adjacent passenger suites 202.

The bridge 204 and/or the suite wall 206 may be implemented as a divider or structure separating adjacent passenger suites 202 and/or separating a passenger suite 202 from an area within the aircraft cabin 200. For example, where the bridge 204 is implemented as a separator, the bridge 204 may be configured to allow for the multiple passenger suites 202 to be installed within the aircraft cabin 200 in a more compact arrangement. In this regard, the amount of floor area of the aircraft cabin 200 necessary for the one or more aircraft seats 210 may be reduced.

It is noted portions of the suite wall 206 have been cut away or removed for purposes of clarity within FIGS. 2A-2B.

The one or more passenger suites 202 may include one or more aircraft seats 210 (e.g., business class or first-class passenger seats). It is noted the terms "aircraft seats" and "passenger seats" may be considered equivalent, for purposes of the disclosure.

The one or more aircraft seats 210 may include, but are not limited to, seat pans, seat cushions, legs, support members, actuatable armrests, seat belts, or the like. The one or more aircraft seats 210 may be attachable to embedded seat tracks located in a floor of the aircraft cabin 200 via conventional track fasteners and/or be couplable to the suite wall 206 (e.g., where the suite wall 206 may be attachable to embedded seat tracks located in the floor of the aircraft cabin 200 via conventional track fasteners).

An aircraft seat 210 may be rotatable about an axis (e.g., swivelable). The aircraft seat 210 may be fully positionable between the outer limits of motion as defined by the moveable components of the aircraft seat 210 and/or one or more auxiliary monuments of the passenger suite 202. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 210 may be actuatable (e.g., translatable and/or rotatable) from the TTL position to a non-TTL position, and/or vice versa. Further, it is noted the aircraft seat 210 may be capable of a fully upright or raised position, and that the TTL position may have a more reclined seat back cushion and a more angled upward seat pan cushion as compared to the fully upright or raised position. Therefore, the above description should not be interpreted as a limitation on the present disclosure but merely an illustration.

In general, the aircraft seat 210 may be translatable (e.g., trackable or slidable). The aircraft seat 210 may be rotatable about an axis cross-wise through the aircraft seat 210 into a position including, but not limited to, an upright or raised position, one or more lounge or reclined positions, and a lie-flat or bed position. For example, the aircraft seat 210 may transition directly between the upright or raised position and the lie-flat or bed position. By way of another example, it is noted the aircraft seat 210 may transition through one or more lounge or reclined positions between the upright or raised position and the lie-flat or bed position. By way of another example, the aircraft seat 210 may transition into one or more lounge reclined positions in a motion separate from the transition between the upright or raised position and the lie-flat or bed position. Therefore, the above description should not be interpreted as a limitation on the scope of the disclosure but merely an illustration.

The aircraft seat 210 may be configured to avoid contact with the one or more auxiliary monuments 212 when transitioning between positions (e.g., between the upright or raised position and the lie-flat or bed position). It is noted that at least some components (e.g., at least a portion of the bridge 204, the suite wall 206 with suite wall elements 208, the one or more auxiliary monuments, or the like) may conform to a portion of an aircraft seat 210. In this regard, the amount of floor area of the aircraft cabin 200 necessary for the one or more aircraft seats 210 may be reduced.

Figure 3A:
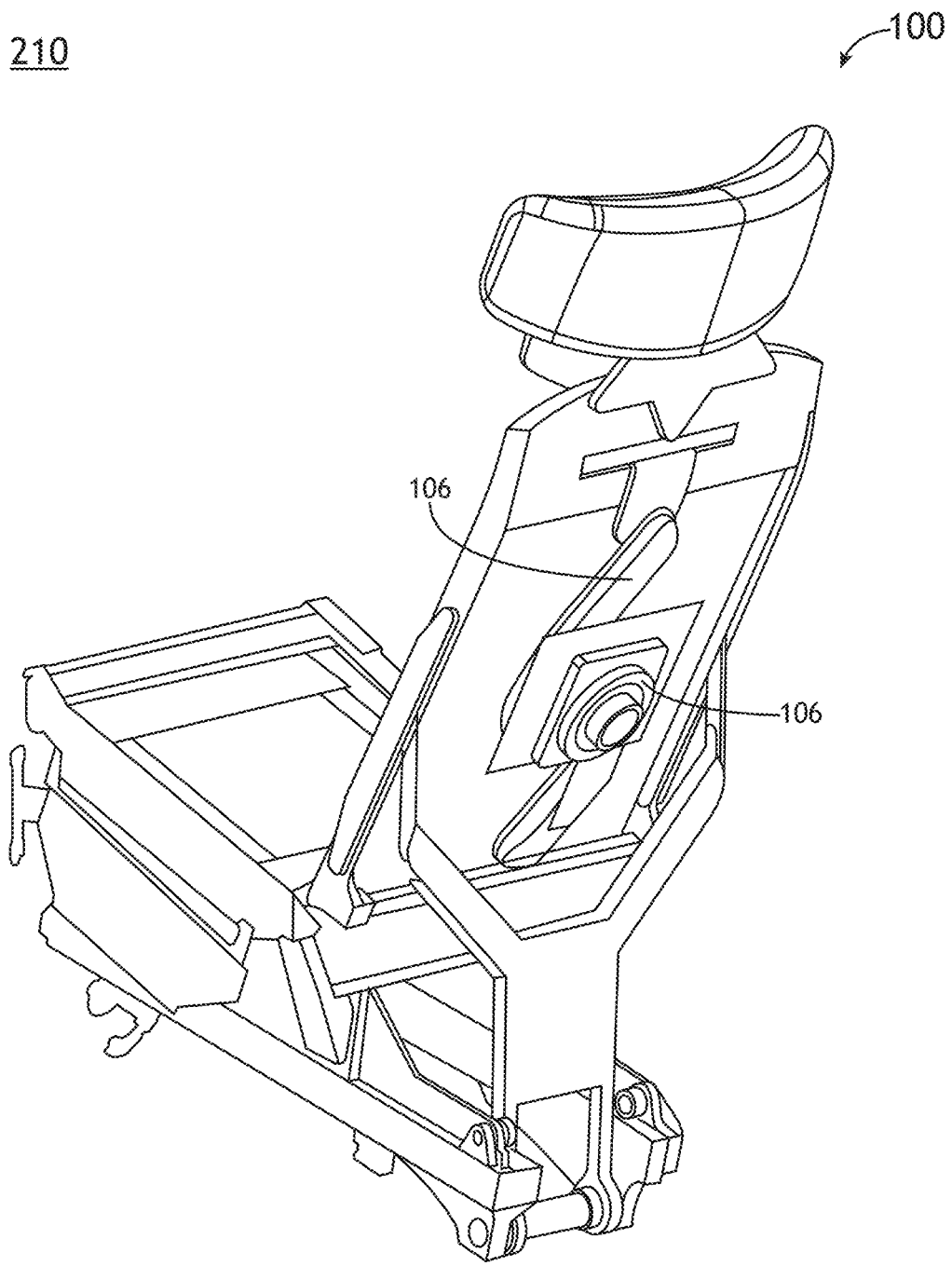
FIG. 3A is a simplified schematic of an aircraft seat of the aircraft passenger suite, in accordance with one or more embodiments of the disclosure.
Figure 3B:
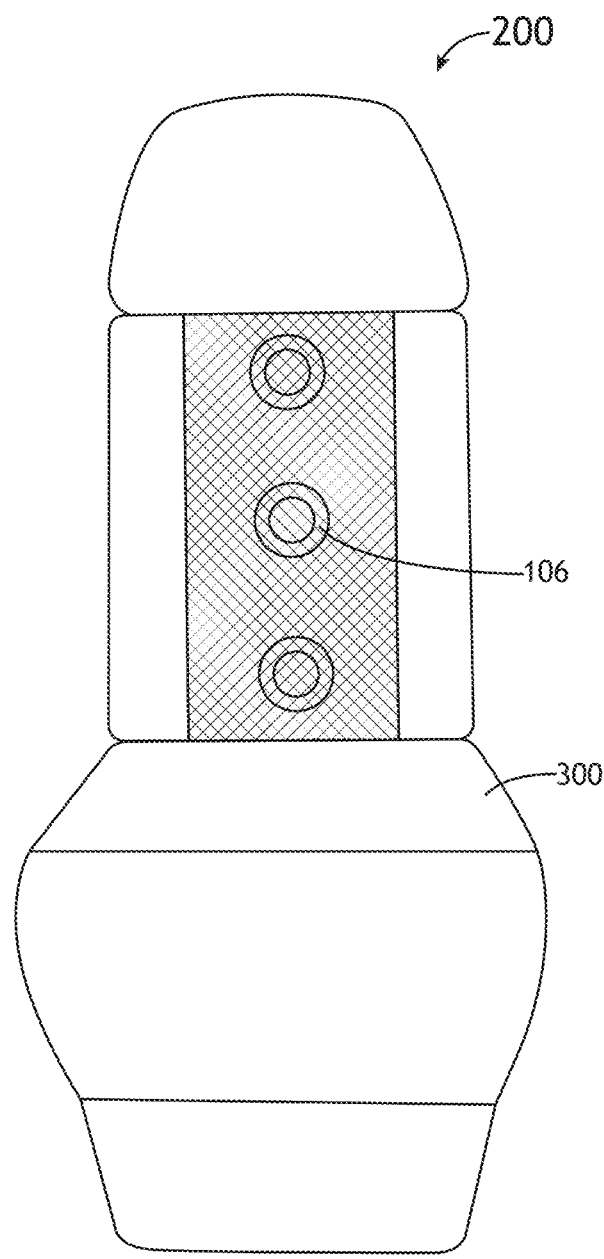
FIG. 3B is a simplified schematic of an aircraft seat of the aircraft passenger suite, in accordance with one or more embodiments of the disclosure.

Referring to FIG. 3B, in embodiments, the aircraft seat 210 may include one or more air bladders 300.

In embodiments, the aircraft seat 210 may include one or more pressure sensors.

In embodiments, the aircraft seat 210 may include a seat heating/cooling module. Heating and cooling of cushions for aircraft seats is generally discussed in U.S. Publication No. 20250353599, published on Nov. 20, 2025, which is herein incorporated by reference in the entirety.

Lattice structures for aircraft seat cushions is generally discussed in U.S. Patent Publication No. 20250333175, published on Oct. 30, 2025, which is herein incorporated by reference in the entirety.

The one or more auxiliary monuments may include, but are not limited to, a structure 212 with a horizontal (or substantially horizontal) surface such as a tray or table, a side stand, or the like. The structure 212 may include a top surface, a bottom surface, and/or one or more side surfaces. For example, a structure 212 may include a single continuous side surface where all corners are rounded. By way of another example, the structure 212 may include up to an N number of side surfaces where the auxiliary monument includes up to an N number of corners. The structure 212 may be actuatable (e.g., may extend a select distance from a stored position to an extended position proximate to a passenger, similar to an aircraft tray table). It is noted, however, that the structure 212 may be fixed in position.

The one or more auxiliary monuments may include, but are not limited to, a structure with a vertical (or substantially vertical) surface such as an actuatable privacy panel of the bridge 204. The structure may be untrimmed or may be covered with trim (e.g., interior or exterior décor panels) matching other trim within the passenger suite 202 (and/or the aircraft cabin 200).

The structure 216 may have an in-flight entertainment (IFE) device 216 attached to its vertical (or substantially vertical) surface. For example, where the structure is actuatable, the IFE device 216 may be actuatable. It is noted the structure may itself be an IFE device 216. In addition, it is noted the IFE device 216 may be coupled to other monuments (e.g., in an actuatable position or a fixed position) within the aircraft cabin 200.

The passenger suite 202 may include one or more accessories. It is contemplated herein that the one or more accessories may include, but are not limited to, one or more lights or lighted panels 217, one or more IFE devices 216, one or more speakers configured to provide media content separate from the media content shown on the one or more IFE devices 216 and/or accompanying the media content shown on the one or more IFE devices 216, one or more ventilation devices, one or more aircraft seat 210 actuation devices (e.g., assemblies, controls, actuators, and/or the like), one or more air flow or temperature control devices, one or more visual and/or auditory output control devices, or the like. For example, the aircraft passenger suite 202 may include one or more lights 217 coupled to and/or partially inset in the one or more suite wall elements 208 of the suite wall 206, the bridge 204, or other locations within the passenger suite 202. By way of another example, the aircraft passenger suite 202 may include one or more air flow or temperature control devices coupled to and/or partially inset in the one or more suite wall elements 208 of the suite wall 206, the bridge 204, or other locations within the passenger suite 202. By way of another example, the one or more accessories may include one or more electronics or electronic devices.

Figure 8:
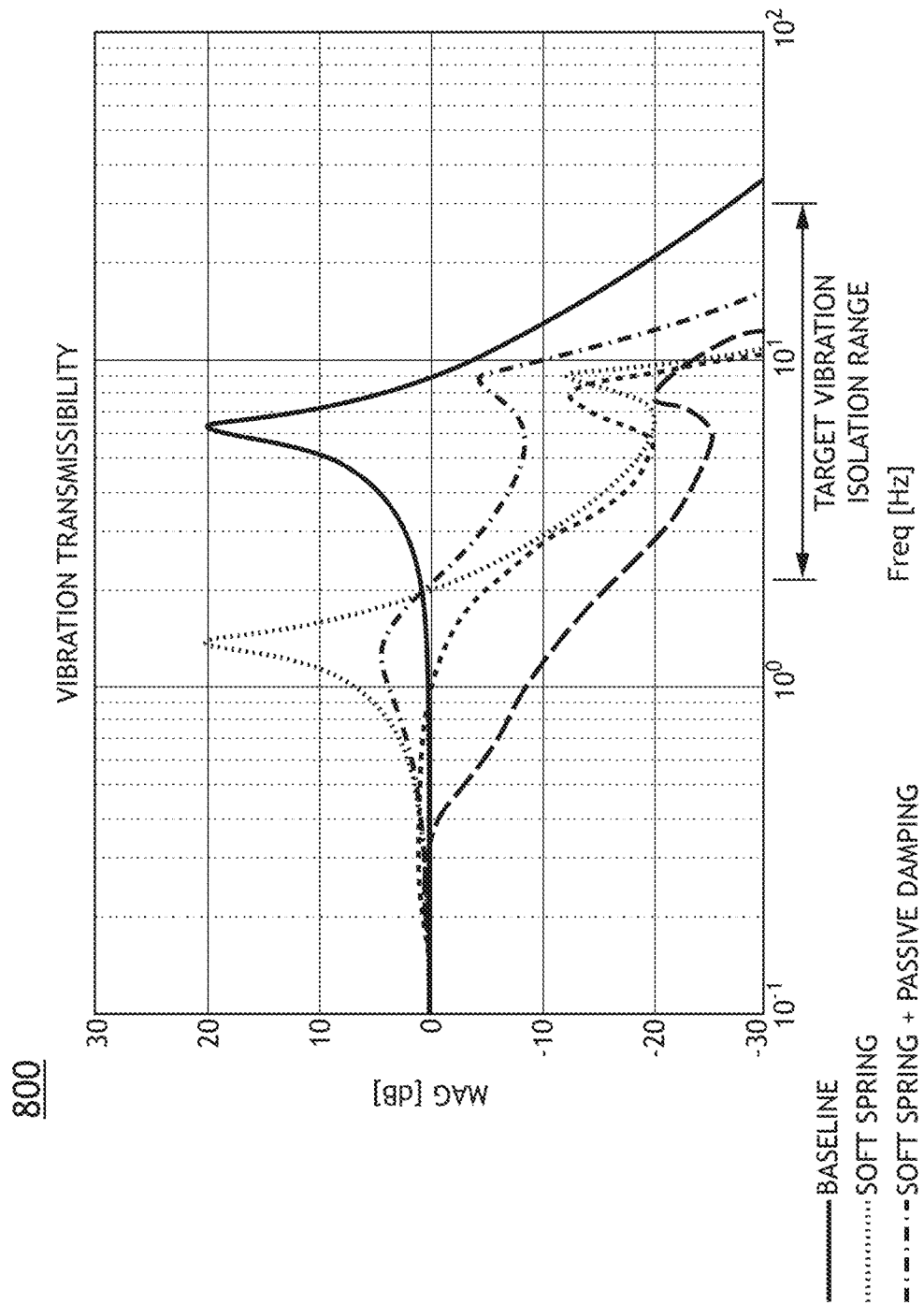
FIG. 8 is a plot depicting vibrational transmissibility, in accordance with one or more embodiments of the disclosure.

Referring to FIG. 8, in embodiment, the aircraft seat 210 may provide vibration reduction/mitigation. FIG. 8 illustrates a plot 800 depicting vibrational transmissibility, in accordance with one or more embodiments of the disclosure. It is contempatled herein that vibration reduction/mitigation may be through active vibration dampening or passive vibration dampening. For example, passive elements may include, but are not limited to, the material/design of the cushion (e.g., lattice foam structure), air bladders, fluid filled dampeners, or the like. By way of another example, active elements may include, but are not limited to, radioactive elements (e.g., to automatically manipulate the radio frequency to reduce noise), or the like.

In a non-limiting example, the aircraft seat 210 may provide active pressure manipulation to remove low frequency vibrations to enhance sleep quality. For instance, the cushion and the air bladder of the aircraft seat 210 may together provide active pressure manipulation to reduce and remove low frequency vibrations to enhance sleep quality.

In an additional non-limiting example, mid to high frequency vibrations may be passively reduced (or removed) by the use of the cushion material/design of the aircraft seat 210 itself. Further, high frequency vibrations may be isolated through any suitable techniques.

Figure 4:
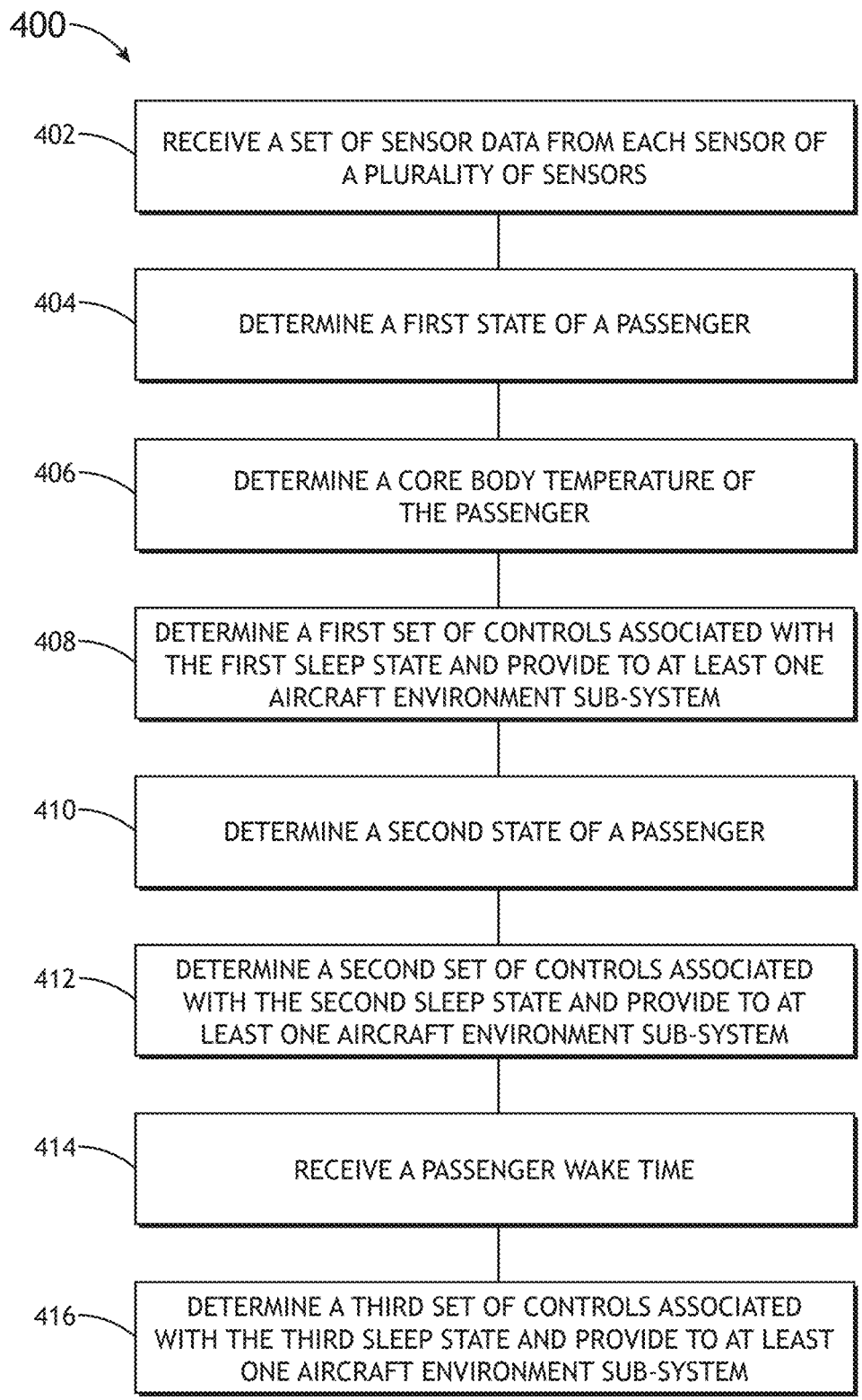
FIG. 4 is a flowchart depicting a method or process for real-time passenger monitoring and comfort control, in accordance with one or more embodiments of the disclosure.

FIG. 4 illustrates a flowchart depicting a method 400 for real-time passenger monitoring and comfort control, in accordance with one or more embodiments of the disclosure.

In a step 402, a set of sensor data from each sensor of the plurality of sensors may be received. For example, the one or more processors 112 may be configured to receive sensor data from at least one of the one or more optical sensors 104, the one or more thermal sensors 106, or the one or more pressure sensors 108.

In embodiments, the one or more processors 112 may be configured to receive an image feed (or video feed) of a passenger within the passenger suite 202 from one or more optical cameras 104. For example, the one or more optical cameras 104 may be configured to continuously or periodically capture an image feed (or video feed) of the passenger. In this regard, the image feed (or video feed) of the passenger may be used by the one or more processors 112 to determine a state of the passenger (e.g., awake, attempting to sleep, or sleeping) based on one or more factors, as will be discussed further herein with respect to one or more of steps 404, 410.

In embodiments, the one or more processors 112 may be configured to receive pressure sensor data from the one or more pressure sensors 108 integrated within the seat cushion. For example, the pressure sensor data may include passenger movement data. By way of another example, the passenger sensor data may include passenger respiratory rate and/or heart rate. In this regard, the activity level of the passenger may be determined based on the pressure data in conjunction with the image/video feed from the optical camera 104 to determine other sleep critical states such as the act of a passenger going to sleep (or actively sleeping).

In embodiments, the one or more processors 112 may be configured to receive a temperature between the passenger and a seat cushion from the one or more thermal sensors 106 integrated within the seat cushion. For example, the one or more integrated seat thermal sensors 106 may be configured to measure a temperature between the seat cushion and the skin of the passenger. In this regard, the one or more thermal sensors 106 integrated within the seat may measure the skin temperature of the passenger, which is not visible to the thermal camera, such that the system 100 is able to accurately measure a body temperature of the passenger.

In embodiments, the one or more processors 112 may be configured to receive thermal images of a passenger within the passenger suite 202 from one or more thermal cameras 106. For example, the one or more thermal sensors 106 may be configured to continuously or periodically capture a thermal image feed (or video feed) of a passenger to monitor a passenger's front facing surface temperature.

Figure 5:
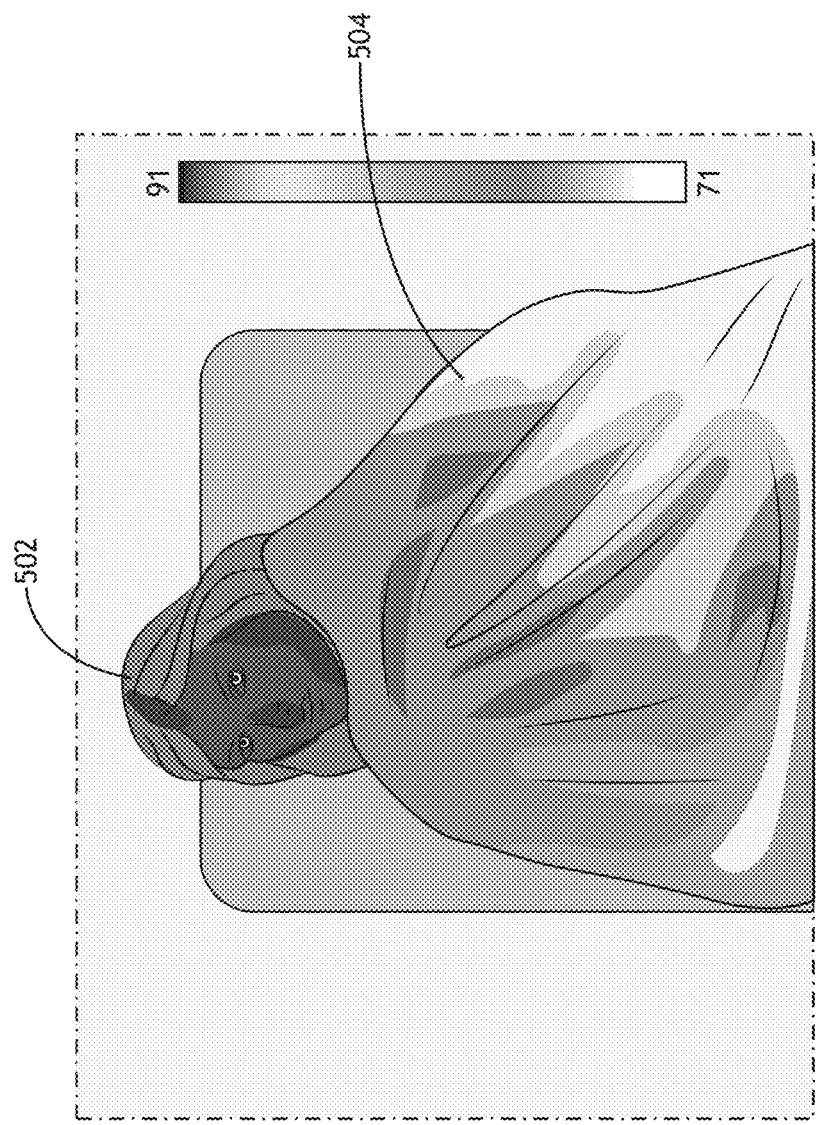
FIG. 5 is a thermal image of a passenger within the aircraft seat of the aircraft passenger suite, in accordance with one or more embodiments of the disclosure.

FIG. 5 illustrates a thermal image 500 of a passenger 502 covered with a blanket 504, in accordance with one or more embodiment of the disclosure.

In embodiments, the one or more thermal sensors 106 (e.g., thermal camera) may include a thermal model configured to evaluate a passenger's front facing temperature whether the skin surface area of a passenger 502 is in the field of view (FOV) or covered by an article 504 (e.g., clothing, blankets, or the like). For example, the one or more thermal sensors 106 may include a one-dimensional (1D) thermal model configured to detect the appearance of said article, where said article is correlated to established thermal properties. In this regard, the skin temperature (regardless of said article) can be determined by the thermal camera 106.

It is contemplated herein that the optical camera 104/thermal camera 106 may continuously or periodically capture images/videos of the passenger and provide the images/videos in near real-time to the one or more processors 112 for continuous or periodic monitoring of the passenger's sleep state and body temperature. It is further contemplated that the image feed (or video feed) may be a single or separate image feed (or video feed), such that the optical/thermal camera may individually or separately provide such image feed (or video feed).

In a step 404, a first sleep state of a passenger is determined based on the received set of sensor data from the plurality of sensors 102. For example, the one or more processors 112 may determine whether the passenger is attempting to go to sleep based on the received set of sensor data from the plurality of sensors 102 and one or more predetermined factors.

In embodiments, a state machine of the one or more processors 112 (or artificial intelligence model/machine learning model) may be used to determine whether the passenger is attempting to go to sleep based on the received set of sensor data from the plurality of sensors 102 and the one or more predetermined factors. For example, in a non-limiting example, the one or more predetermined factors may include whether the image feed (or video feed) from the optical camera 104 (or thermal camera 106) indicates that the passenger has ceased activities (e.g., turned off the IFE, put away their personal devices (e.g., mobile phone, tablet, or the like), finished put away their tray table, or the like. By way of another example, in a non-limiting example, the one or more predetermined factors may include whether the eyes or open or close as indicated by the sensor data from the optical camera 104 (or thermal camera 106). By way of another example, in a non-limiting example, the one or more predetermined factors may include a position of the passenger and/or seat position of the passenger as indicated by one of the image feed of the optical camera 104 (or thermal camera 106), pressure sensor data of the pressure sensors 108, seat position sensors, or the like. As such, the state machine of the one or more processors 112 may determine that the passenger is trying to go to sleep based on the cessation of activities.

It is contemplated herein that the state machine of the one or more processors 112 may prioritize (or weight) the sensor data from the plurality of sensors 102 when making the determination that the passenger is attempting to sleep based on an associated confidence level.

In an optional step 406, upon determining the first sleep state of the passenger, a core body temperature may be determined. For example, the temperature data from the thermal camera 106 and integrated temperature sensors 106 may be used to determine a core body temperature. In this regard, a core body temperature prior to going to sleep may be determined, such that said body temperature may be maintained once the passenger is asleep.

In a step 408, a first set of controls associated with the first sleep state may be determined for at least one aircraft environment sub-system and provided to the at least one aircraft environment sub-system automatically, in near real-time. For example, the one or more processors 112 may automatically determine a first set of controls, in near real-time, associated with trying to go to sleep to help the passenger fall asleep.

In embodiments, the first set of controls associated with falling asleep may include adjusting the ambient lighting of the passenger aircraft suite 202. For example, the ambient lighting of the passenger aircraft suite 202 may be dimmed (or completely shut off) to help the passenger fall asleep. By way of another example, the wavelength of the ambient lighting of the passenger aircraft suite 202 may be adjusted to help the passenger fall asleep.

Figure 6:
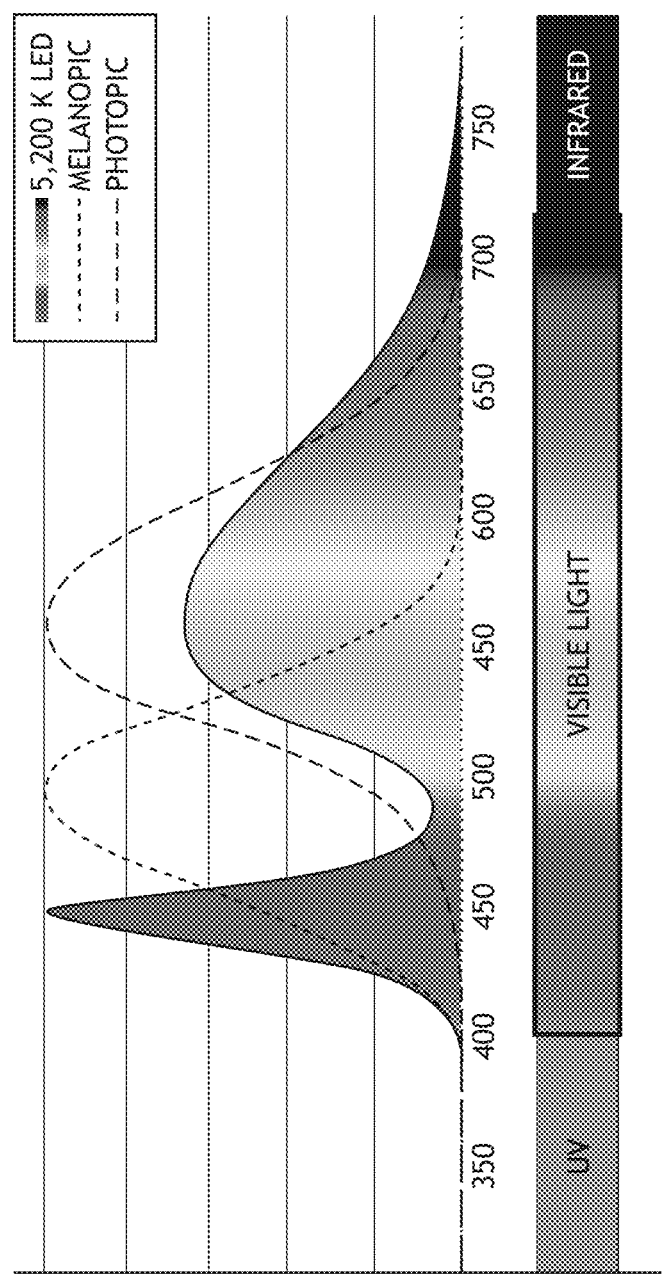
FIG. 6 is a plot depicting a relationship between wavelength of light and circadian rhythm, in accordance with one or more embodiments of the disclosure.

FIG. 6 depicts a plot 600 illustrates a relationship between illumination wavelength and circadian rhythm. For example, as depicted in plot 600, phototropic light may be based on how bright different colors appear (using luminosity weighing), where the peak of photopic light is associated with daylight. Further, as depicted in plot 600, melanopic light may be associated with blue-sensitivity levels. It is contemplated herein that a ratio melanopic/photopic ratio (MR) may be indicate the light's effect on circadian rhythm, where a higher MR indicates a stronger circadian rhythm since blue/cyan content suppresses the production of melatonin and the body and raises the MR. As such, emitting light at a wavelength between approximately 500 nm and 700 nm may promote sleep (e.g., amber or red light).

In embodiments, the first set of controls associated with falling asleep may include activating active noise cancellation within the passenger aircraft suite 202. The active noise cancellation devices may include white noise machines. Further, the active noise cancellation devices may include microphones (or other devices) configured to detect environmental noises and play a complement to the detected noise, such that the passenger cancels the sound out.

In a step 410, a second sleep state of a passenger is determined based on the received set of sensor data from the plurality of sensors 102. For example, the one or more processors 112 may determine whether the passenger has fallen asleep based on the received set of sensor data from the plurality of sensors 102 and one or more predetermined factors.

In embodiments, a state machine of the one or more processors 112 (or artificial intelligence model/machine learning model) may be used to determine whether the passenger has fallen asleep based on the received set of sensor data from the plurality of sensors 102 and the one or more predetermined factors. For example, in a non-limiting example, the one or more predetermined factors may include whether the image feed (or video feed) from the optical camera 104 (or thermal camera 106) indicates that the passenger has closed their eyes. By way of another example, in a non-limiting example, the one or more predetermined factors may include a position of the passenger and/or seat position of the passenger as indicated by one of the image feed of the optical camera 104 (or thermal camera 106), pressure sensor data of the pressure sensors 108, seat position sensors, or the like. As such, the state machine of the one or more processors 112 may determine that the passenger has fallen sleep based on the cessation of activities.

It is contemplated herein that the state machine of the one or more processors 112 may prioritize (or weight) the sensor data from the plurality of sensors 102 when making the determination that the passenger has fallen sleep based on an associated confidence level.

In a step 412, a second set of controls associated with the second sleep state may be determined for at least one aircraft environment sub-system and provided to the at least one aircraft environment sub-system automatically, in near real-time. For example, the one or more processors 112 may automatically determine a second set of controls, in near real-time, associated with sleeping to improve the passenger's sleep quality.

In embodiments, the second set of controls associated with sleeping may include adjusting a temperature of the passenger aircraft suite 202. For example, in a non-limiting example, the cushion temperature of the aircraft seat 210 may be adjusted to support a deep sleep state based on a predetermined temperature profile. By way of another example, in a non-limiting example, the temperature of the passenger aircraft suite 202 itself may be adjusted to support a deep sleep state based on a predetermined temperature profile.

Figure 7:
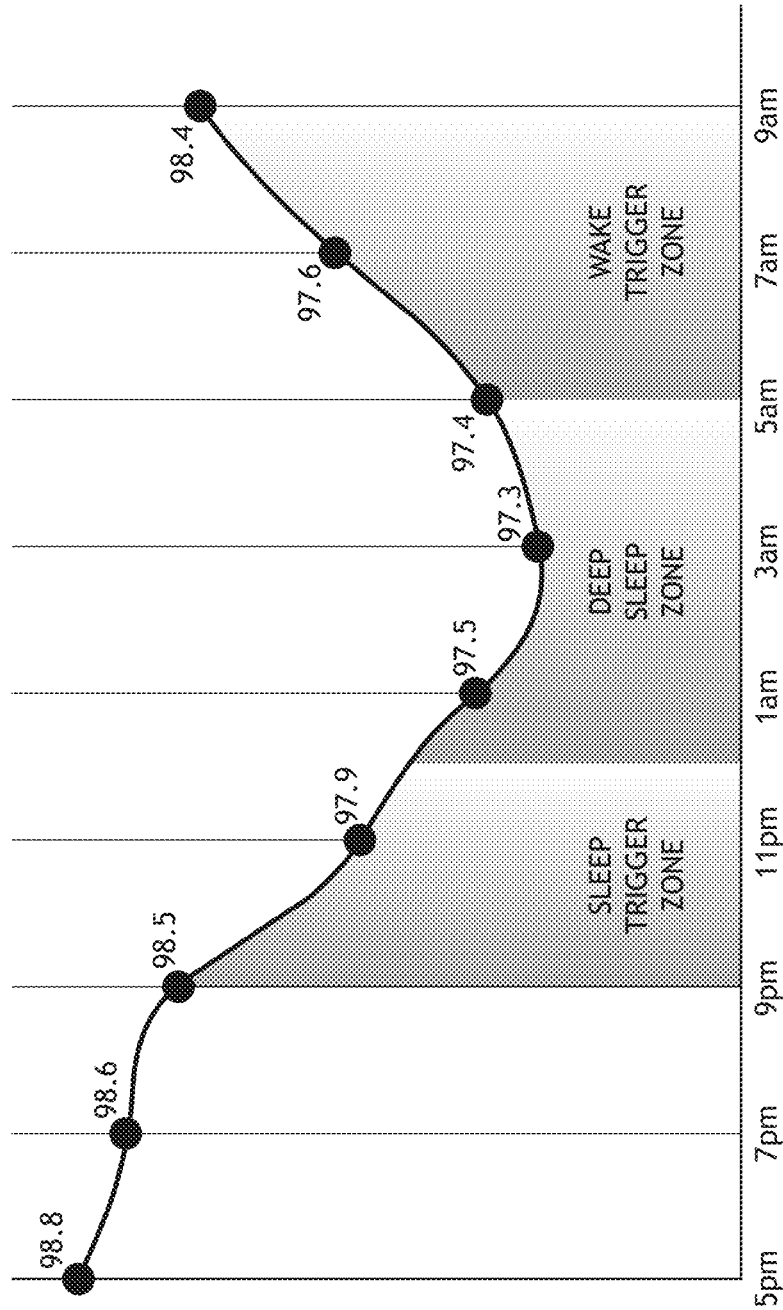
FIG. 7 is a plot depicting a relationship between body core temperature and sleep zones, in accordance with one or more embodiments of the disclosure.

FIG. 7 depicts a plot 700 illustrating the relationship between body core temperature and various sleep zones. For example, as depicted in plot 700, a deep sleep zone may be associated with a core body temperature between approximately 97.4 and 97.7. As such, the one or more processors 112 may direct the temperature sensors of the cushion and/or temperature system of the aircraft suite 202 to adjust the respective temperature such that the passenger's measured core body temperature is within such range, thus supporting the deep sleep state to improve the passenger's sleep quality.

In embodiment, the second set of controls associated with sleeping may include adjusting an active uniform pressure distribution of the aircraft seat 210 of the passenger aircraft suite 202. For example, in a non-limiting example, the air bladders of the seat cushion may be individually adjusted to support sleep. As mentioned previously herein, if the processors 112 determine that the passenger is sleeping in a certain position (e.g., back, side, stomach, or the like), the air bladders of the seat cushion may be adjusted to prevent high pressure peaks.

In embodiments, the second set of controls associated with sleeping may include adjusting the ambient light of the passenger aircraft suite 202. For example, in a non-limiting example, the brightness of the ambient light may be increased in the passenger aircraft suite 202 to promote waking up. By way of another example, in a non-limiting example, the wavelength of the ambient light of the passenger aircraft suite 202 may be adjusted to support the circadian rhythm. Referring to FIG. 6, emitting light at a wavelength between approximately 400 nm and 500 nm may promote waking up.

In an optional step 414, a passenger wake time is received. For example, the one or more processors 112 may receive a passenger wake time via a user interface device communicatively coupled to the controller 110. In this regard, a passenger may input a desired wake time. By way of another example, the passenger wake time may be inputted manually by a crew member or automatically based on the flight schedule itself.

In an optional step 416, a third set of controls associated with the passenger's wake time may be determined for at least one aircraft environment sub-system and provided to the at least one aircraft environment sub-system automatically, in near real-time. For example, the one or more processors 112 may automatically determine a third set of controls, in near real-time, associated with gradually waking up said passenger.

Referring to FIG. 7, a wake zone may be associated with a core body temperature between approximately 97.4 and 98.4. As such, the one or more processors 112 may direct the temperature sensors of the cushion and/or temperature system of the aircraft suite 202 to adjust the respective temperature such that the passenger's measured core body temperature is within such range, thus gradually waking up said passenger (rather than jolting them awake).

Although embodiments of the disclosure are directed to an aviation environment such as an aircraft cabin 200, it is noted the system 100 is not limited to the aviation environment and/or the aircraft components within the aviation environment. For example, the system 100 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the system 100 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system comprising:
    a plurality of sensors, wherein the plurality of sensors comprise:
        one or more optical sensors configured to capture one of an image feed or a video feed of a passenger;
        one or more thermal sensors configured to measure a body temperature of the passenger; and
        one or more pressure sensors; and
    a controller communicatively coupled to the plurality of sensors, the controller including one or more processors configured to execute program instructions configured to cause the one or more processors to:
        receive a set of sensor data from the plurality of sensors, wherein the set of sensor data includes at least one of the captured image feed, the captured video feed, the measured body temperature of the passenger, a respiratory rate of the passenger, or a heart rate of the passenger;
        determine a first sleep state of the passenger based on received set of sensor data from the plurality of sensors and one or more predetermined factors, wherein the first sleep state of the passenger includes attempting to fall asleep;
        determine a first set of controls associated with the first sleep state for at least one aircraft environment sub-system;
        provide the first set of controls associated with the first sleep state to the at least one aircraft environment sub-system automatically, in near real-time;
        determine a second sleep state of the passenger based on the received set of sensor data from the plurality of sensors and one or more additional predetermined factors, wherein the second sleep state includes sleeping;
        determine a second set of controls associated with the second sleep state for the at least one aircraft environment sub-system; and
        provide the second set of controls associated with the second sleep state to the at least one aircraft environment sub-system automatically, in near real-time.

2. The system of claim 1, wherein the determine a first set of controls associated with the first sleep state for at least one aircraft environment sub-system comprises:
    adjusting a noise cancellation device to promote falling asleep.

3. The system of claim 1, wherein the determine a second set of controls associated with the second sleep state for at least one aircraft environment sub-system comprises:
    adjusting a pressure distribution of one or more air bladders within a seat cushion of an aircraft seat.

4. The system of claim 1, wherein the one or more optical sensors include one or more optical cameras, wherein the one or more optical cameras are passenger-facing to one of continuously or periodically capture one of the image feed or the video feed of the passenger.

5. The system of claim 1, wherein the one or more pressure sensors are integrated within a seat cushion of an aircraft seat.

6. The system of claim 1, wherein the determine a first set of controls associated with the first sleep state for at least one aircraft environment sub-system comprises:
    adjusting an ambient light of the at least one aircraft environment sub-system to promote falling asleep.

7. The system of claim 6, wherein the adjusting an ambient light to promote falling asleep comprises at least one of adjusting a brightness level of the ambient light or adjusting a wavelength of the ambient light.

8. The system of claim 1, wherein the one or more thermal sensors include one or more thermal cameras, wherein the one or more thermal cameras are passenger-facing to one of continuously or periodically capture one of the image feed or the video feed of the passenger, wherein the one or more thermal cameras are configured to measure a surface facing temperature of the passenger.

9. The system of claim 8, wherein the controller is further configured:

identify an article on the passenger based on the thermal image feed or the thermal video feed based on a one-dimensional thermal model.

10. The system of claim 1, wherein the one or more thermal sensors includes one or more temperature sensors integrated within a seat cushion of an aircraft seat, wherein the one or more temperature sensors are configured to measure a temperature between an interface of the passenger and the seat cushion of the aircraft seat.

11. The system of claim 10, wherein the one or more temperature sensors include one or more thermocouples.

12. The system of claim 1, wherein the determine a second set of controls associated with the second sleep state for the at least one aircraft environment sub-system comprises:
adjusting a core body temperature of the passenger.

13. The system of claim 12, wherein the adjusting a core body temperature of the passenger comprises:
adjusting a cushion temperature of an aircraft seat.

14. The system of claim 12, wherein the adjusting a core body temperature of the passenger comprises:
adjusting a heating and cooling system of an aircraft passenger suite.

15. The system of claim 1, wherein the controller is further configured to:
receive a passenger wake up time.

16. The system of claim 15, wherein the controller is further configured to:
determine a third set of controls associated with the passenger wake up time for the at least one aircraft environment sub-system.

17. The system of claim 16, wherein the determine a third set of controls associated with the passenger wake up time for the at least one aircraft environment sub-system comprises:
adjusting an ambient light to promote falling asleep, wherein the adjusting an ambient light to promote falling asleep comprises at least one of adjusting a brightness level of the ambient light or adjusting a wavelength of the ambient light.

18. The system of claim 16, wherein the determine a third set of controls associated with the passenger wake up time for the at least one aircraft environment sub-system comprises:
adjusting a core body temperature of the passenger, wherein the adjusting a core body temperature of the passenger comprises at least one of adjusting a cushion temperature of an aircraft seat or adjusting a heating and cooling system of an aircraft passenger suite.

19. A method comprising:
receiving a set of sensor data from a plurality of sensors, wherein the set of sensor data includes at least one of an image feed, a video feed, a measured body temperature of a passenger, a respiratory rate of the passenger, or a heart rate of the passenger;
determining a first sleep state of the passenger based on the received set of sensor data from the plurality of sensors and one or more predetermined factors, wherein the first sleep state of the passenger includes attempting to fall asleep;
determining a first set of controls associated with the first sleep state for at least one aircraft environment sub-system;
providing the first set of controls associated with the first sleep state to the at least one aircraft environment sub-system automatically, in near real-time;
determining a second sleep state of the passenger based on the received set of sensor data from the plurality of sensors and one or more additional predetermined factors, wherein the second sleep state includes sleeping;
determining a second set of controls associated with the second sleep state for the at least one aircraft environment sub-system; and
providing the second set of controls associated with the second sleep state to the at least one aircraft environment sub-system automatically, in near real-time.

20. A passenger aircraft seat comprising:
an aircraft seat;
one or more aircraft environment sub-systems;
a plurality of sensors, wherein the plurality of sensors comprise:
one or more optical sensors configured to capture one of an image feed or a video feed of a passenger;
one or more thermal sensors configured to measure a body temperature of the passenger; and
one or more pressure sensors integrated within the aircraft seat; and
a controller communicatively coupled to the plurality of sensors, the controller including one or more processors configured to execute program instructions configured to cause the one or more processors to:
receive a set of sensor data from the plurality of sensors, wherein the set of sensor data includes at least one of the captured image feed, the captured video feed, the measured body temperature of the passenger, a respiratory rate of the passenger, or a heart rate of the passenger;
determine a first sleep state of the passenger based on the received set of sensor data from the plurality of sensors and one or more predetermined factors, wherein the first sleep state of the passenger includes attempting to fall asleep;
determine a first set of controls associated with the first sleep state for at least one aircraft environment sub-system of the one or more aircraft environment sub-systems;
provide the first set of controls associated with the first sleep state to the at least one aircraft environment sub-system of the one or more aircraft environment sub-systems automatically, in near real-time;
determine a second sleep state of a passenger based on the received set of sensor data from the plurality of sensors and one or more additional predetermined factors, wherein the second sleep state includes sleeping;
determine a second set of controls associated with the second sleep state for the at least one aircraft environment sub-system of the one or more aircraft environment sub-systems; and
provide the second set of controls associated with the second sleep state to the at least one aircraft environment sub-system of the one or more aircraft environment sub-systems automatically, in near real-time.

* * * * *